July 11, 1950  L. K. BULLMAN ET AL  2,514,741
CUTTING TORCH HOLDER
Filed March 15, 1948  2 Sheets-Sheet 1
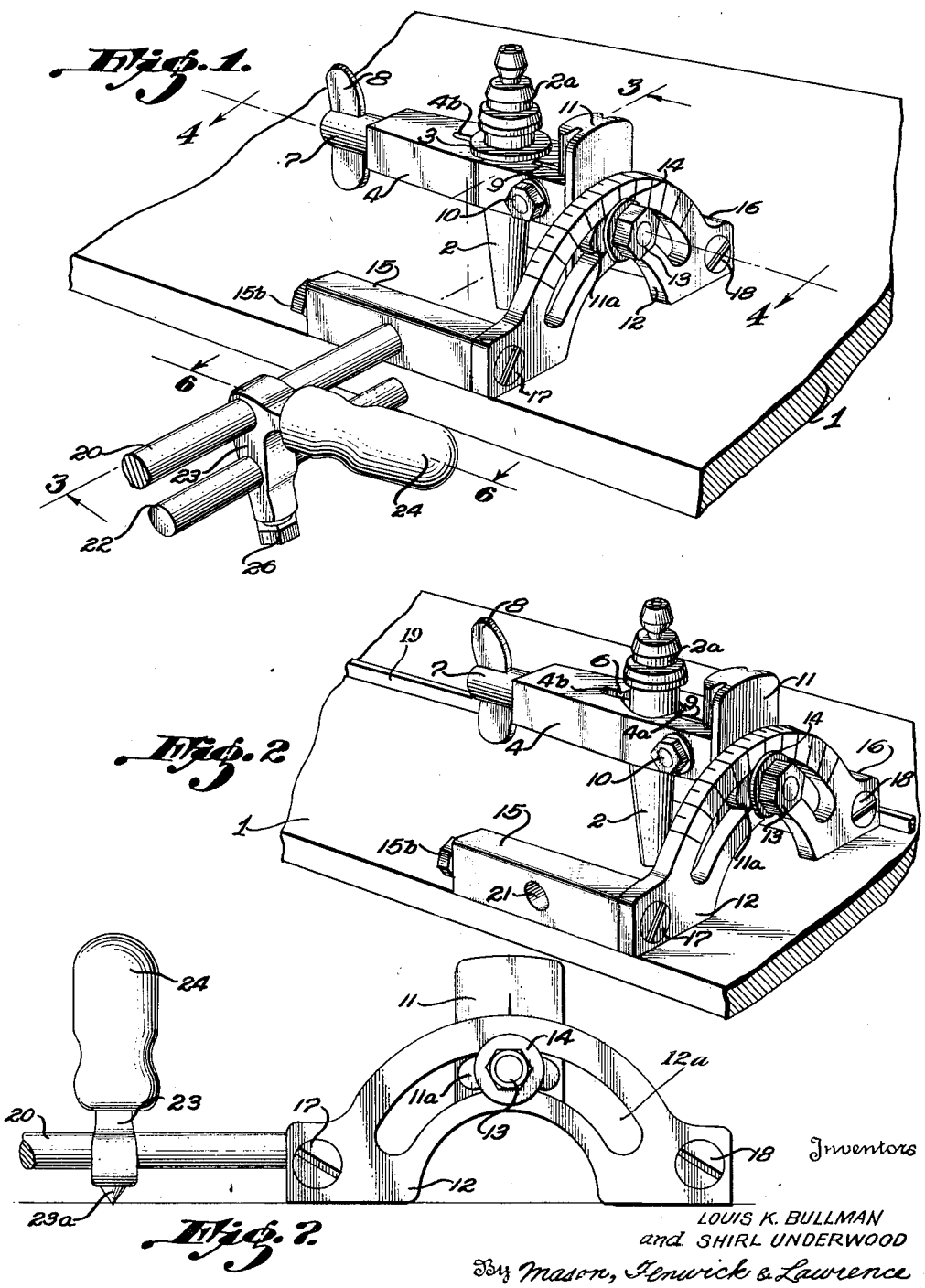

July 11, 1950  L. K. BULLMAN ET AL  2,514,741
CUTTING TORCH HOLDER
Filed March 15, 1948  2 Sheets-Sheet 2
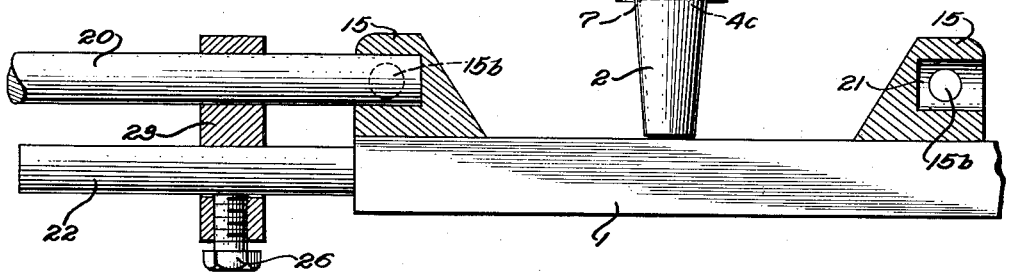
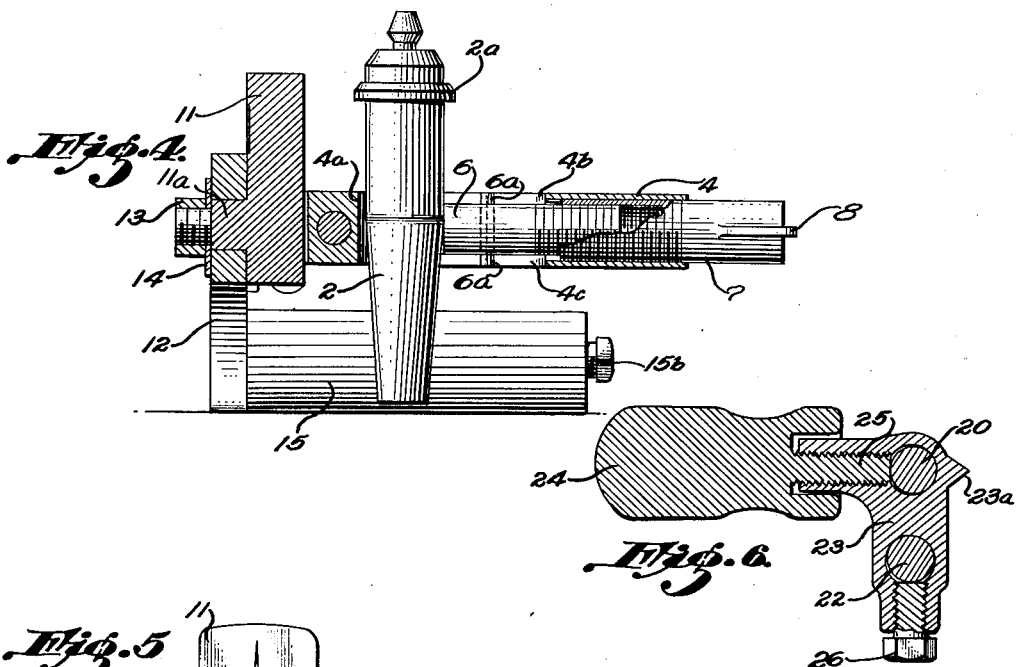
Inventors
LOUIS K. BULLMAN
and SHIRL UNDERWOOD
By Mason, Fenwick & Lawrence
Attorneys Patented July 11, 1950

2,514,741

UNITED STATES PATENT OFFICE 2,514,741

CUTTING TORCH HOLDER

Louis K. Bullman and Shirl Underwood,
Norfolk, Va.

Application March 15, 1948, Serial No. 14,924

4 Claims. (Cl. 266—23)

This invention relates to a cutting torch holder and, more particularly, to improvements in a cutting torch holder for permitting a wide variety of adjustments in the support of a cutting torch, particularly angular and vertical adjustments, together with accessories for facilitating guiding of the holder along templates, straight edges or the edge of the work to be cut.

Holders or carriages for adjustably supporting cutting or blow torches are broadly old in the art. However, common types of holders have the disadvantage of not providing sufficient adjustments for accommodating different diameters and lengths of torch tips. Furthermore, they do not provide satisfactory vertical and angular adjustments to provide the proper distance between the torch and work for different types of torch tips and to permit cutting at an angle to provide bevelled edges on the work.

Another disadvantage of common types of holders is that they are not readily adaptable for guidance by either straight or curved templates or by rules or by the work itself. A further disadvantage of common types of torch holders or carriages is that they are generally cumbersome in construction and expensive to manufacture.

An object of the present invention is to provide a novel cutting torch holder that is devoid of the above named disadvantages of common types of holders.

A more specific object of the present invention is to provide a carriage or holder for supporting the tip of a blow torch, which holder is of such construction as to provide a wide latitude of adjustment, particularly vertical and angular, to enable cutting by different sizes and types of blowtorch tips, that is those having different diameters and lengths, and to enable cutting of the work at an angle.

A further object of the invention is to provide a cutting torch holder having suitable slides or runners to enable guidance by a straight or curved template or by a rule.

A still more specific object of the present invention is to provide a cutting torch holder having a protractor for supporting a cradle for holding a blowtorch tip, which cradle is angularly adjustable by the protractor to enable cutting at different angles and which cradle is vertically adjustable and provided with suitable clamping means to accommodate torch tips of different diameters and lengths.

A still further object of the present invention is to provide a cutting torch holder with a radius rod adjustment and freely rotatable bushing for supporting the torch tip to enable cutting circles of selectively different radii and, alternately, for providing a guide or gauge for guiding the holder along the edge of the work to be cut to enable cutting of strips from the work.

Other objects and advantages will become apparent from a study of the following specification and claims taken in conjunction with the accompanying drawings, in which:

Figure 1 is a perspective view of a cutting torch holder, together with a sliding gauge to permit guidance of the holder along the edge of the work piece, and which involves the principles of the present invention;

Figure 2 is a perspective view of the cutting torch holder of Fig. 1 wherein the sliding gauge is eliminated as well as the bushing which surrounds the cutting torch tip, which figure illustrates how the cutting torch holder may be slid along and guided by a straight edge or template;

Figure 3 is a cross-sectional view taken along line 3—3 of Fig. 1;

Figure 4 is a cross-sectional view taken on line 4—4 of Fig. 1;

Fig. 5 is a front view, partly in cross section, of the torch holder assembly shown in Fig. 2;

Fig. 6 is an enlarged cross-sectional view taken along the line 6—6 of Fig. 1; and Fig. 7 is a front view of the structure shown in Fig. 1 wherein the sliding gauge assembly is used as a radius rod to guide the holder along a circular path.

Referring more particularly to Figs. 1 and 2 of the drawing, numeral 1 denotes the work to be cut (or welded) by a blow torch (not shown) and numeral 2 denotes the tip of such torch, which tip is of well known construction, having a somewhat tapered nozzle having openings at the bottom thereof through which emerges the flame. The tip 2 has a collar portion 2ª which is adapted to rest on a bushing 3 of antifriction material, such as brass, Babbitt metal, or the like, which bushing is seated in a somewhat rounded hole formed in a cradle 4. The bushing is adapted to be firmly clamped in hole 4ª, extending through the cradle, by means of a plunger 6 (see Fig. 4) which plunger is preferably arcuate shaped along the edge contacting the torch tip to more snugly clamp an arcuate portion of the tip. The other end of plunger 6 is screw-threadedly engaged in an internally threaded collar 7 which is turnable by a key or wing nut 8 within a hole formed in the cradle. Radially extending pins 6ª integrally formed on plunger 6 are guided by longitudinally extending slots 4ᵇ and 4ᶜ formed in the upper and lower portions of cradle 4 to provide pin and slot connections so as to guide the plunger towards and away from clamping engagement with the cutting torch tip without rotation thereof. As shown in Figs. 2 and 4, by tightening up on wing nut 8 plunger 6 is brought into clamping engagement with a peripheral portion of the torch tip 2, the other peripheral portion of the tip engaging the side walls of the hole 4ᵃ extending through the cradle, to firmly clamp the tip in place along any desired portion of the length thereof. The portion of hole 4ᵃ adjacent the protractor plate is pointed or shaped like the bottom of a heart shape to afford a better clamping surface when bushing 3 is omitted as better shown in Fig. 2. It will be seen, therefore, that such clamping arrangement is adaptable to accommodate different diameters of tips as well as different lengths of tips, thus enabling clamping of a wide variety of torch tip designs and provide the proper distance between the flame emerging end of the torch tip and the work.

Vertical adjustment is provided for the cradle by a slot 9 and a nut 10, tightening of which nut brings closer together integral end portions of the cradle so as to clamp the slotted or keyed end portions of the cradle to a vertically extending guide member or bed plate 11. Thus, by unscrewing nut 10 so as to unclamp the keyed end portions of the cradle the entire cradle may be raised or lowered to the proper vertical height, depending upon the length of blowtorch tip used. Then, by tightening the nut, the cradle end portions are clamped to the keyed portion of the bed plate 11 and firmly held in any desired vertical position. It is possible to increase the vertical height of the blowtorch tip also by lifting bushing 3 slightly and then clamping it in the lifted position by tightening wing nut 8.

Angular adjustment is provided for the cutting torch holder by means of a protractor plate 12 which is calibrated through an arc of about 180° so as to provide angular adjustment of about 45° on either side of the vertical. An arcuate slot 12ᵃ is provided in the plate into which extends a somewhat elliptical protuberance 11ᵃ integrally formed on bed plate 11 and which is guided along the slot. By unscrewing a nut 13 away from the washer 14 the entire cradle assembly, including plate 11 may be moved in an arcuate path along the protractor so as to dispose the cradle and blowtorch tip at any desired angle with respect to the work 1. After the desired angle has been obtained, the nut 13 is tightened so as to firmly hold the assembly in place in the desired angular position. The torch will thus cut the work at selectively different angles so as to obtain beveled edges.

Secured to the ends of protractor plate 12 are a pair of slides or straight runners 15 and 16. These are fastened to the protractor plate by means of screws 17 and 18 respectively. The slides or runners are somewhat wedge-shaped but have straight outer sides so as to enable guiding of the runner and holder assembly along a straight edge or ruler such as 19 (see Fig. 2) or along an arcuate or straight template (not shown). Therefore, the slide or runner construction enables easy guiding of the holder along either straight or arcuate paths.

When it is desired to cut off strips of metal from the work 1, an attachment such as shown at the left of Fig. 1 is provided, including a rod 20 which may be extended into a hole such as 21 extending through runner 15 and clamped thereto by threaded bolt 15ᵇ, together with a sliding gauge rod 22. Rods 20 and 22 extend through holes in an angularly shaped member 23. By unscrewing a handle 24, provided with a screw threaded stud 25, the stud is retracted from clamping engagement with rod 20 (see Fig. 6) so as to allow swinging of gauge rod 22 about the axis of rod 20 as a pivot. By tightening up the handle, stud 25 will tightly clamp rod 20 in any desired longitudinal or angular position. A bolt 26 is provided for the purpose of similarly clamping or unclamping the gauge rod 22 in any desired position so as to adjustably position handle 24 and angle member 23 at different distances from the edge of work 1. Gauge rod 22 is slid along the edge of the work for the purpose of guiding the torch tip in parallel relationship to such edge to cut a strip of material from the work. If desired, either rod 20 or 22 or both may be calibrated so as to give a quick visual indication of the distance between the torch cutting tip and the edge of the work 1 to facilitate cutting different widths of strips from the work. The gauge rod 22 may also be slid along an arcuate or straight template (not shown), if desired, or along other similar guiding means.

The cutting torch holder may also be adapted for cutting circular patterns by adjusting the attachment shown at the left of Fig. 1 to serve as a radius rod. This is done by unscrewing handle 24 to unclamp rod 20 and by rotating the angularly shaped member 23 through an angle of 90° so as to extend the pivot point or punch 23ᵃ downwardly so that it may be punched into the work or other surface to define the center of rotation or pivot point of the torch holder. This arrangement is shown more clearly in Fig. 7. By unscrewing handle 24 and increasing the distance between pivot point 23 and the cradle circular patterns of different radii may be cut in the work by the torch tip.

To facilitate circular cutting of the work 1 wing nut 8 is unscrewed so as to unclamp bushing 3 from the cradle 4 and thus allow free rotation of the bushing within the crade hole 4ᵃ as well as free rotation of the torch tip 2 within the bushing 3. This not only reduces friction but prevents the necessity of turning of the tip 2 about its own axis in the course of circular cutting.

Thus, it will be seen that the present invention provides a highly efficient, relatively simple and inexpensive cutting torch holder or carriage which is adapted for a wide variety of adjustments of the torch tip, particularly angular and vertical, and which can accommodate different diameters and lengths of torch tips so that regardless of the design of tip the proper distance is maintained between the flame emerging end of the torch tip and the work; also the invention provides suitable slides and guiding means for guiding the torch tip holder along straight edges, arcuate or straight templates, along the edge of the work to be cut, or along a circular path, as desired.

While for purposes of illustration only one embodiment of the invention is shown and described it will be readily apparent that other modifications will be suggested to those skilled in the art after having had the benefit of the teachings of the present disclosure. However, the invention should be restricted only insofar as the scope of the appended claims.

We claim:

1. A cutting torch holder adapted to slide on the surface of the work comprising a protractor plate having an arcuate slot extending along an arc of about 180° inscribed about the medial longitudinal axis of the holder in the interfacial plane between said holder and the work, a bed plate element having a protuberance extending through said slot to be guided thereby and terminating in a threaded stud, a nut threaded to said stud for adjustably clamping said bed plate element at selective positions along the arc of said protractor plate, said bed plate element having a key portion, a torch tip supporting cradle having integral, slotted clamping portions, means for clamping said clamping portions about said key portion to provide radial adjustment of said cradle relative to said slot for vertically adjusting said torch tip relative the work, said cradle having a hole for receiving and encircling the torch tip, and means for adjustably clamping the torch tip in said hole said protuberance coacting with said arcuate slot to continuously maintain said bed plate element axially aligned with the radii of said arcuate slot and direct said torch tip toward said medial axis.

2. A torch holder as recited in claim 1 together with a pair of runners fastened at right angles to the extremities of said protractor plate to serve as guide means for guiding the holder along a template or straight edge.

3. Apparatus recited in claim 1 together with a bushing fitted in said cradle hole for receiving the torch tip, and wherein said last named adjustable clamping means comprises a threaded stud extending longitudinally through said cradle, together with a nut at one extremity and a plunger at the other extremity thereof, which plunger is adapted to clamp said bushing firmly in place as the result of tightening of said nut.

4. Apparatus recited in claim 1 wherein said last named adjustable clamping means comprises a threaded stud extending longitudinally through said cradle, together with a nut at one extremity and a plunger at the other extremity thereof, which plunger is adapted to clamp the torch tip, extending through said hole, firmly in place as the result of tightening of said nut.

LOUIS K. BULLMAN.
SHIRL UNDERWOOD.

REFERENCES CITED

The following references are of record in the file of this patent:

UNITED STATES PATENTS

| Number | Name | Date |
|---|---|---|
| 1,141,560 | Lack | June 1, 1915 |
| 1,351,846 | Forster | Sept. 7, 1920 |
| 1,553,508 | Cloud | Sept. 15, 1925 |
| 1,668,086 | Orzel | May 1, 1928 |
| 1,852,413 | Hickey | Apr. 5, 1932 |
| 1,931,696 | Hedenstrom | Oct. 24, 1933 |
| 2,018,378 | Nass | Oct. 22, 1935 |
| 2,296,480 | Nicolai | Sept. 22, 1942 |

FOREIGN PATENTS

| Number | Country | Date |
|---|---|---|
| 599,124 | France | Jan. 5, 1926 |